(12) United States Patent
Matsubayashi et al.

(10) Patent No.: US 7,688,390 B2
(45) Date of Patent: Mar. 30, 2010

(54) BROADCAST RECEIVING APPARATUS, TV SET, AND CONTROL METHOD OF BROADCAST RECEIVING APPARATUS

(75) Inventors: Kazuhiro Matsubayashi, Yokohama (JP); Kazuna Maruyama, Fuchu (JP); Yoshikazu Shibamiya, Tokyo (JP); Osamu Yonishi, Yokohama (JP); Yasushi Shikata, Tama (JP); Koji Mito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 345 days.

(21) Appl. No.: 11/935,058

(22) Filed: Nov. 5, 2007

(65) Prior Publication Data
US 2008/0106644 A1 May 8, 2008

(30) Foreign Application Priority Data
Nov. 8, 2006 (JP) .............................. 2006-303382

(51) Int. Cl.
H04N 5/44 (2006.01)
H04N 5/50 (2006.01)

(52) U.S. Cl. .................. 348/731; 348/555; 348/734

(58) Field of Classification Search ......... 348/731–734, 348/725, 553–555, 563, 569, 570; 725/38, 725/48, 59, 131, 139, 151; H04N 5/44, 5/50
See application file for complete search history.

(56) References Cited

U.S. PATENT DOCUMENTS 5,512,955 A * 4/1996 Toyoshima et al. ........... 725/56
5,564,088 A * 10/1996 Saitoh ...................... 455/186.1
7,071,997 B2 * 7/2006 Seo ............................. 348/569
7,373,650 B1 * 5/2008 Rodriguez et al. ............ 725/41
7,546,623 B2 * 6/2009 Ramraz et al. ................ 725/48

FOREIGN PATENT DOCUMENTS

| JP | 02-073787 A | 3/1990 |
|---|---|---|
| JP | 2004-147066 A | 5/2004 |
| JP | 2004-363910 A | 12/2004 |
| JP | 2005-142827 A | 6/2005 |
| JP | 2005-318551 | 11/2005 |
| JP | 2005-318551 A | 11/2005 |
| JP | 2006-197084 A | 7/2006 |

* cited by examiner

Primary Examiner—Trang U Tran
(74) Attorney, Agent, or Firm—Cowan, Liebowitz & Latman, P.C.

(57) ABSTRACT

There is provided a broadcast receiving apparatus having a broadcast receiving unit. The apparatus includes: an instruction receiving unit which receives a broadcasting type selection instruction or a channel number selection instruction, and a control unit which, when the instruction receiving unit receives the broadcasting type selection instruction, controls the broadcast receiving unit to receive a broadcast wave specified by a combination of a current channel number and a type of broadcasting corresponding to the received selection instruction if an elapsed time from latest reception of a channel number selection instruction is not more than a predetermined time, and receive a broadcast wave specified by a combination of a type of broadcasting corresponding to the received selection instruction and a default channel number associated with the type of broadcasting if the elapsed time from the latest reception of a channel number selection instruction is more than the predetermined time.

9 Claims, 14 Drawing Sheets

FIG. 5

| TYPE OF BROAD-CASTING | CHANNEL NUMBER (1~12) | CHANNEL NUMBER (3 DIGITS) | BS/CS DIGITAL TUNER CHANNEL SELECTION PARAMETERS | | |
|---|---|---|---|---|---|
| | | | NETWORK IDENTIFICATION (HEXADECIMAL) | TRANSPORT STREAM IDENTIFICATION (HEXADECIMAL) | SERVICE IDENTIFICATION (DECIMAL) |
| BS DIGITAL | 1 | 101 | 0x0004 | 0x40F1 | 101 |
| BS DIGITAL | 2 | 102 | 0x0004 | 0x40F1 | 102 |
| BS DIGITAL | 3 | 103 | 0x0004 | 0x40F2 | 103 |
| BS DIGITAL | 4 | 141 | 0x0004 | 0x4000 | 141 |
| BS DIGITAL | 5 | 151 | 0x0004 | 0x4010 | 151 |
| BS DIGITAL | 6 | 161 | 0x0004 | 0x4011 | 161 |
| BS DIGITAL | 7 | 171 | 0x0004 | 0x4031 | 171 |
| BS DIGITAL | 8 | 181 | 0x0004 | 0x40D1 | 181 |
| BS DIGITAL | 9 | 191 | 0x0004 | 0x4030 | 191 |
| BS DIGITAL | 10 | 200 | 0x0004 | 0x40F0 | 200 |
| BS DIGITAL | 11 | NO VALUE | NO VALUE | NO VALUE | NO VALUE |
| BS DIGITAL | 12 | NO VALUE | NO VALUE | NO VALUE | NO VALUE |
| CS DIGITAL | 1 | 100 | 0x0007 | 0x7040 | 100 |
| CS DIGITAL | 2 | 110 | 0x0007 | 0x70C0 | 110 |
| CS DIGITAL | 3 | 123 | 0x0007 | 0x7060 | 123 |
| CS DIGITAL | 4 | 300 | 0x0007 | 0x7180 | 300 |
| CS DIGITAL | 5 | 250 | 0x0007 | 0x70E0 | 250 |
| CS DIGITAL | 6 | 160 | 0x0007 | 0x7160 | 160 |
| CS DIGITAL | 7 | 177 | 0x0007 | 0x7120 | 177 |
| CS DIGITAL | 8 | 302 | 0x0007 | 0x7140 | 302 |
| CS DIGITAL | 9 | 194 | 0x0007 | 0x7040 | 194 |
| CS DIGITAL | 10 | 200 | 0x0007 | 0x7100 | 200 |
| CS DIGITAL | 11 | NO VALUE | NO VALUE | NO VALUE | NO VALUE |
| CS DIGITAL | 12 | NO VALUE | NO VALUE | NO VALUE | NO VALUE |

FIG. 6

| TYPE OF BROAD-CASTING | CHANNEL NUMBER (1~12) | CHANNEL NUMBER (3 DIGITS) | TERRESTRIAL DIGITAL TUNER CHANNEL SELECTION PARAMETERS | | |
|---|---|---|---|---|---|
| | | | NETWORK IDENTIFICATION (HEXADECIMAL) | TRANSPORT STREAM IDENTIFICATION (HEXADECIMAL) | SERVICE IDENTIFICATION (DECIMAL) |
| TERRESTRIAL DIGITAL | 1 | 011 | 0x7FE0 | 0x7FE0 | 0x0400 |
| TERRESTRIAL DIGITAL | 2 | 021 | 0x7FE1 | 0x7FE1 | 0x0408 |
| TERRESTRIAL DIGITAL | 3 | 031 | 0x7E77 | 0x7E77 | 0x6038 |
| TERRESTRIAL DIGITAL | 4 | 041 | 0x7FE2 | 0x7FE2 | 0x0410 |
| TERRESTRIAL DIGITAL | 5 | 051 | 0x7FE5 | 0x7FE5 | 0x0428 |
| TERRESTRIAL DIGITAL | 6 | 061 | 0x7FE3 | 0x7FE3 | 0x0418 |
| TERRESTRIAL DIGITAL | 7 | 071 | 0x7FE6 | 0x7FE6 | 0x0430 |
| TERRESTRIAL DIGITAL | 8 | 081 | 0x7FE4 | 0x7FE4 | 0x0420 |
| TERRESTRIAL DIGITAL | 9 | NO VALUE | NO VALUE | NO VALUE | NO VALUE |
| TERRESTRIAL DIGITAL | 10 | NO VALUE | NO VALUE | NO VALUE | NO VALUE |
| TERRESTRIAL DIGITAL | 11 | NO VALUE | NO VALUE | NO VALUE | NO VALUE |
| TERRESTRIAL DIGITAL | 12 | 121 | 0x7FE8 | 0x7FE8 | 0x0440 |

FIG. 7

| TYPE OF BROAD-CASTING | CHANNEL NUMBER (1~12) | CHANNEL NUMBER (3 DIGITS) | TERRESTRIAL ANALOG TUNER CHANNEL SELECTION PARAMETER |
|---|---|---|---|
| | | | VHF/UHF CHANNEL |
| TERRESTRIAL ANALOG | 1 | 001 | VHF1 |
| TERRESTRIAL ANALOG | 2 | 002 | NO VALUE |
| TERRESTRIAL ANALOG | 3 | 003 | VHF3 |
| TERRESTRIAL ANALOG | 4 | 004 | VHF4 |
| TERRESTRIAL ANALOG | 5 | 005 | NO VALUE |
| TERRESTRIAL ANALOG | 6 | 006 | VHF6 |
| TERRESTRIAL ANALOG | 7 | 007 | NO VALUE |
| TERRESTRIAL ANALOG | 8 | 008 | VHF8 |
| TERRESTRIAL ANALOG | 9 | 042 | UHF42 |
| TERRESTRIAL ANALOG | 10 | 010 | VHF10 |
| TERRESTRIAL ANALOG | 11 | 016 | VHF16 |
| TERRESTRIAL ANALOG | 12 | 012 | VHF12 |

F I G. 8A

| BUTTON PRESS COUNT | BUTTON NAME | STATE AFTER BUTTON PRESS | | REMARKS |
| --- | --- | --- | --- | --- |
| | | TYPE OF BROADCASTING | CHANNEL NUMBER | |
| BEFORE OPERATION | | TERRESTRIAL DIGITAL | 1 | |
| 1 | 3 | TERRESTRIAL DIGITAL | 3 | |
| 2 | BS | BS DIGITAL | 3 | DESIRED CHANNEL |

FIG. 8B

| BUTTON PRESS COUNT | BUTTON NAME | STATE AFTER BUTTON PRESS | | REMARKS |
|---|---|---|---|---|
| | | TYPE OF BROADCASTING | CHANNEL NUMBER | |
| BEFORE OPERATION | | TERRESTRIAL DIGITAL | 1 | |
| 1 | 3 | TERRESTRIAL DIGITAL | 1 | CHANNEL DOES NOT CHANGE BECAUSE CHANNEL 3 DOES NOT EXIST |
| 2 | BS | BS DIGITAL | 3 | DESIRED CHANNEL |

FIG. 9A

| BUTTON PRESS COUNT | BUTTON NAME | STATE AFTER BUTTON PRESS | | REMARKS |
| --- | --- | --- | --- | --- |
| | | TYPE OF BROADCASTING | CHANNEL NUMBER | |
| BEFORE OPERATION | 3-DIGIT INPUT | | | |
| 1 | 1 | TERRESTRIAL DIGITAL | 011 | |
| 2 | 0 | TERRESTRIAL DIGITAL | 011 | |
| 3 | 3 | TERRESTRIAL DIGITAL | 011 | |
| 4 | BS | TERRESTRIAL DIGITAL | 103 | |
| 5 | | BS DIGITAL | 103 | DESIRED CHANNEL |

FIG. 9B

| BUTTON PRESS COUNT | BUTTON NAME | STATE AFTER BUTTON PRESS | | REMARKS |
|---|---|---|---|---|
| | | TYPE OF BROADCASTING | CHANNEL NUMBER | |
| BEFORE OPERATION | 3-DIGIT INPUT | | | |
| 1 | 1 | TERRESTRIAL DIGITAL | 011 | |
| 2 | 0 | TERRESTRIAL DIGITAL | 011 | |
| 3 | 3 | TERRESTRIAL DIGITAL | 011 | |
| 4 | BS | TERRESTRIAL DIGITAL | 011 | CHANNEL DOES NOT CHANGE BECAUSE CHANNEL 103 DOES NOT EXIST |
| 5 | | BS DIGITAL | 103 | DESIRED CHANNEL |

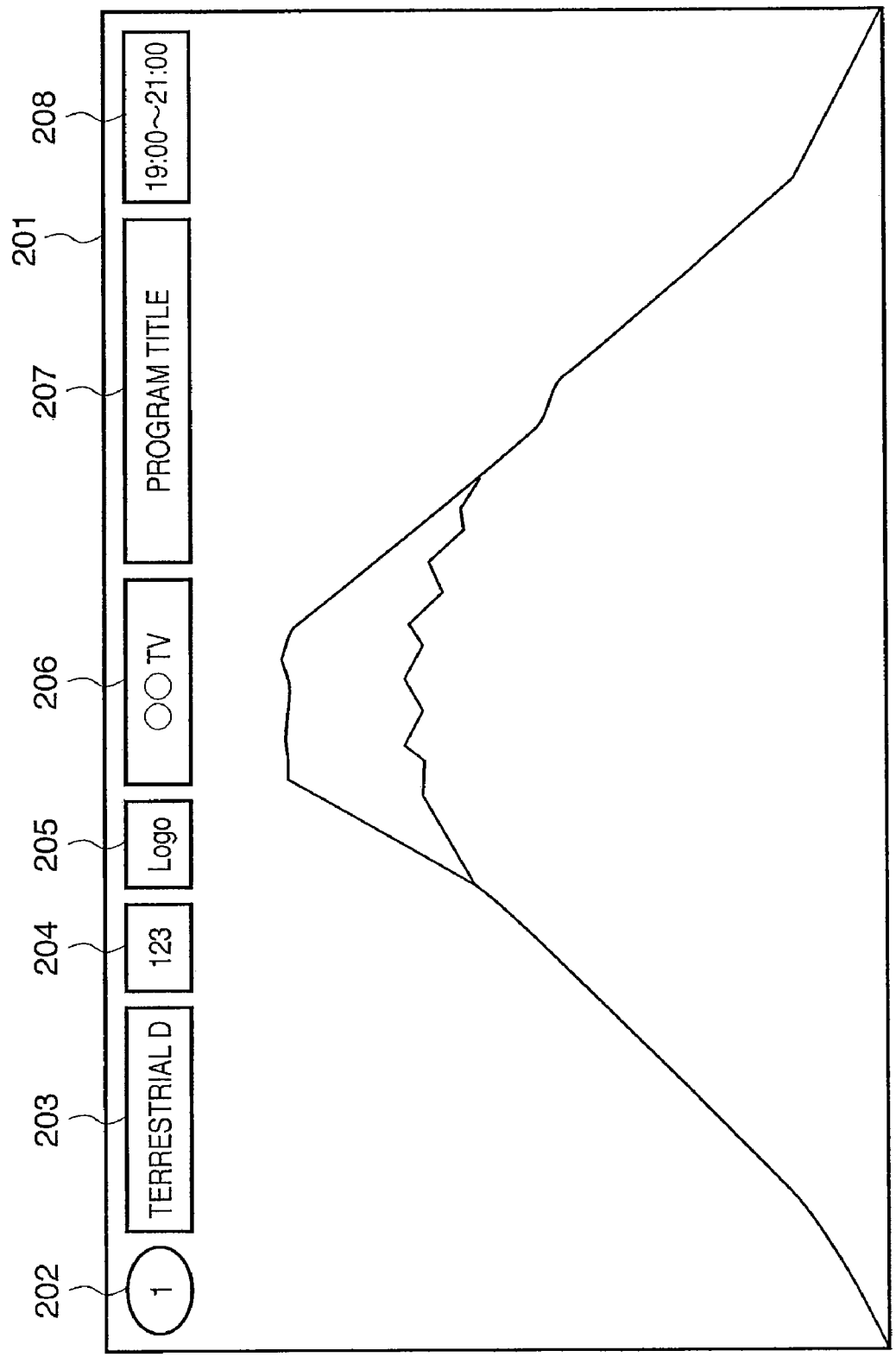

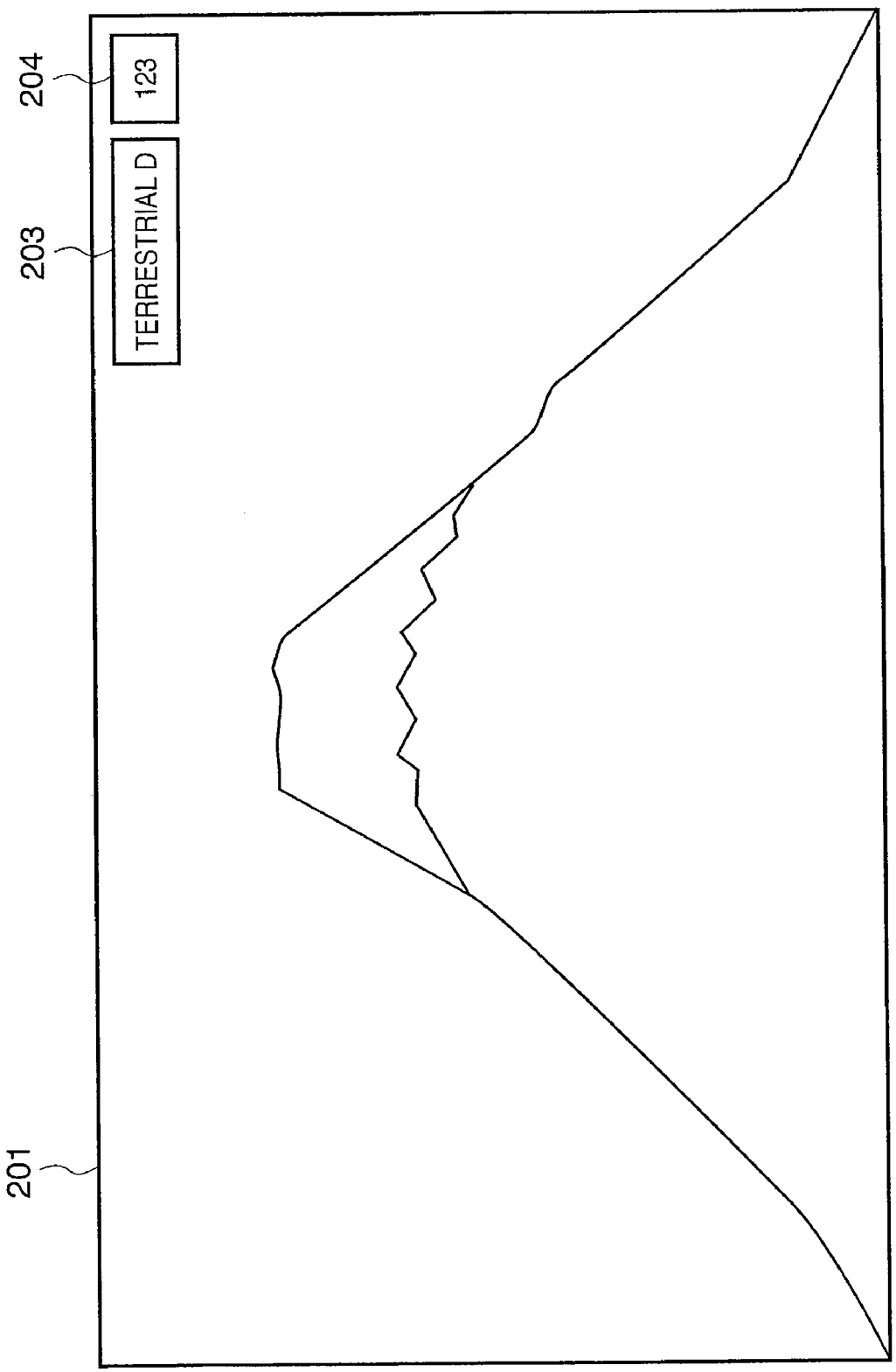

BROADCAST RECEIVING APPARATUS, TV SET, AND CONTROL METHOD OF BROADCAST RECEIVING APPARATUS

BACKGROUND OF THE INVENTION

1. Field of the Invention

The present invention relates to a broadcast receiving apparatus for selectively receiving a broadcast wave specified by a combination of a type of broadcasting and a channel number, a TV set, and a control method of the broadcast receiving apparatus.

2. Description of the Related Art

TV sets capable of receiving a plurality of types of broadcasting (e.g., BS digital broadcasting, CS digital broadcasting, terrestrial digital broadcasting, and terrestrial analog broadcasting) are becoming popular presently. A TV set user who wants to watch a program that is being broadcast by a desired channel in a desired type of broadcasting operates the TV set in accordance with a procedure to be described below.

If the type of broadcasting of the desired program is different from that of the program the user is currently watching, the user instructs the TV set using a remote controller or the like to select the desired type of broadcasting (e.g., BS digital broadcasting). Upon receiving the user's instruction, the TV set receives the broadcast wave of the default channel (e.g., the channel that was finally selected for the type of broadcasting) of the designated type of broadcasting (e.g., BS digital broadcasting) and displays a video image contained in the received broadcast wave. Next, the user instructs the TV set using a remote controller or the like to select the desired channel (e.g., channel 103) (for example, the user presses the remote controller's "3" button assigned to channel 103). Upon receiving the user's instruction, the TV set receives the broadcast wave of the designated channel of the current type of broadcasting and displays a video image contained in the received broadcast wave.

If the desired program and the program the user is currently watching are of the same type of broadcasting, the instruction to select the desired type of broadcasting may be omitted. The user need only instruct the TV set to select the desired channel.

According to Japanese Patent Laid-Open No. 2005-318551, a digital TV set has a remote controller with a plurality of numeric keys. For every type of broadcasting, specific channels are associated with the respective numeric keys. When a user presses a specific numeric key continuously within a predetermined time, the digital TV set of Japanese Patent Laid-Open No. 2005-318551 sequentially switches and selects a type of broadcasting. At this time, the digital TV set selects a channel associated with a numeric key pressed for the selected type of broadcasting.

As described above, when the user switches the type of broadcasting, the conventional TV set selects the default channel for the selected type of broadcasting. If the user misunderstands the currently selected type of broadcasting (for example, if the user misunderstands that the currently selected type of broadcasting is BS digital broadcasting, although it is actually terrestrial digital broadcasting), the following problems may arise.

Assume that the user wants to select, e.g., channel 103 of BS digital broadcasting and presses the "3" key corresponding to channel 103 of BS digital broadcasting. In this case, if the currently selected type of broadcasting is terrestrial digital broadcasting, the TV set selects a channel (e.g., channel 031 of terrestrial digital broadcasting) corresponding to the "3" key for terrestrial digital broadcasting, contrary to the user's intention. When the user selects BS digital broadcasting by pressing a broadcasting type switch key on the remote controller, the default channel (e.g., channel 151) of BS digital broadcasting is selected. The user must press the "3" key on the remote controller again, and this operation is cumbersome.

Assume that the technique disclosed in Japanese Patent Laid-Open No. 2005-318551 is applied to the above-described problem. In this case, after channel 031 of terrestrial digital broadcasting is selected contrary to the intention of the user, he/she can select the desired channel 103 of BS digital broadcasting by pressing the "3" key several times continuously within a predetermined time. However, if there are, e.g., four types of broadcasting, the user cannot select the desired type of broadcasting unless he/she presses the "3" key three times at maximum, and this operation is still cumbersome. If the user overshoots by momentum in continuously pressing the "3" key, he/she must press the "3" key many more times until the desired type of broadcasting is selected.

SUMMARY OF THE INVENTION

The present invention has been made in consideration of the above-described situations. More specifically, the present invention is characterized by providing a technique of further facilitating a user operation of selecting a desired channel number in a desired type of broadcasting in a broadcast receiving apparatus for selectively receiving a broadcast wave specified by a combination of a type of broadcasting and a channel number.

According to an aspect of the present invention, there is provided a broadcast receiving apparatus having a broadcast receiving unit which selectively receives a broadcast wave specified by a combination of a type of broadcasting and a channel number, comprising:

an instruction receiving unit which receives a broadcasting type selection instruction or a channel number selection instruction; and a control unit which, when the instruction receiving unit receives the broadcasting type selection instruction, controls the broadcast receiving unit to receive a broadcast wave specified by a combination of a current channel number and a type of broadcasting corresponding to the received selection instruction if an elapsed time from latest reception of a channel number selection instruction is not more than a predetermined time, and receive a broadcast wave specified by a combination of a type of broadcasting corresponding to the received selection instruction and a default channel number associated with the type of broadcasting if the elapsed time from the latest reception of a channel number selection instruction is more than the predetermined time.

According to another aspect of the present invention, there is provided a control method of a broadcast receiving apparatus having a broadcast receiving unit which selectively receives a broadcast wave specified by a combination of a type of broadcasting and a channel number, comprising steps of:

receiving a broadcasting type selection instruction or a channel number selection instruction; and when the broadcasting type selection instruction is received in the step of receiving, controlling the broadcast receiving unit to receive a broadcast wave specified by a combination of a current channel number and a type of broadcasting corresponding to the received selection instruction if an elapsed time from latest reception of a channel number selection instruction is not more than a predetermined time, and receive a broadcast wave specified by a combination of a type of broadcasting corresponding to the received selection instruction and a default channel number associated with the type of broadcasting if the elapsed time from the latest reception of a channel number selection instruction is more than the predetermined time.

Further features of the present invention will become apparent from the following description of exemplary embodiments with reference to the attached drawings.

BRIEF DESCRIPTION OF THE DRAWINGS

FIG. 5 is a table showing an example of correspondence between channel numbers and channel selection parameters of a BS/CS digital tuner;

FIG. 6 is a table showing an example of correspondence between channel numbers and channel selection parameters of a terrestrial digital tuner;

FIG. 7 is a table showing an example of correspondence between channel numbers and channel selection parameters of a terrestrial analog tuner;

FIGS. 8A and 8B are tables showing detailed examples of the broadcasting type selection process and channel number selection process;

FIGS. 9A and 9B are tables showing detailed examples of the broadcasting type selection process and channel number selection process;

FIG. 11 is a view showing an example of program information displayed by the program information processing unit of the digital TV set; and FIG. 12 is a view showing another example of program information displayed by the program information processing unit of the digital TV set.

DESCRIPTION OF THE EMBODIMENTS

Preferred embodiments of the present invention will now be described with reference to attached drawings. Each embodiment described below will be helpful in understanding a variety of concepts from the generic to the more specific.

It should be noted that the technical scope of the present invention is defined by claims, and is not limited by each embodiment described below. In addition, not all combinations of the features described in the embodiments are necessarily required for realizing the present invention.

The embodiments will be described below in which the technique of the present invention is applied to a TV set (to be referred to as a "digital TV" hereinafter) compatible with digital broadcasting (e.g., BS digital broadcasting, CS digital broadcasting, and terrestrial digital broadcasting). However, it is also possible to apply the embodiments to a TV set compatible with, e.g., only analog broadcasting (e.g., BS analog broadcasting, CS analog broadcasting, and terrestrial analog broadcasting). The embodiments are also applicable to a broadcast receiving apparatus other than a TV set including a display apparatus integrated with a tuner, for example, a recording apparatus having an analog or digital TV tuner. In this case, a user can enjoy a broadcast program by connecting an external display apparatus (e.g., TV set or display monitor apparatus) to the recording apparatus. The TV set includes a device having an equivalent function such as a personal computer, set top box (STB), or portable phone having a TV tuner.

First Embodiment

<System Configuration>

Figure 1:
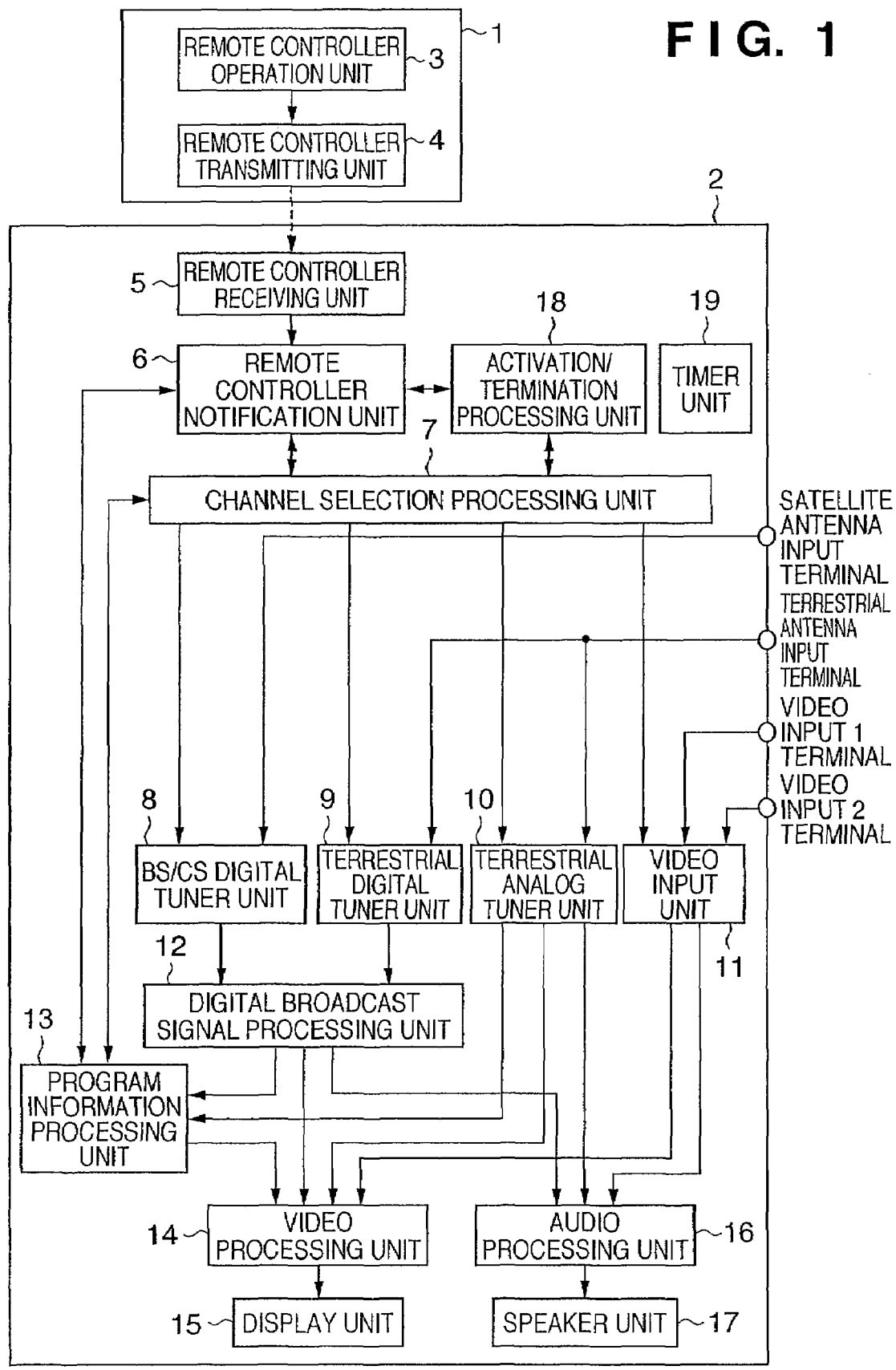
FIG. 1 is a block diagram showing a system including a digital TV set using the technique of the present invention and a remote controller to operate the digital TV set.

FIG. 1 is a block diagram showing a system including a digital TV 2 using the technique of the present invention and a remote controller 1 to operate the digital TV 2.

In the remote controller 1, a remote controller operation unit 3 has various kinds of buttons (keys) to select a channel (to be referred to as "channel selection" hereinafter) and execute other operations. When the user presses a button, a remote controller transmitting unit 4 transmits an infrared light signal corresponding to the pressed button. The remote controller 1 will be described later in detail with reference to FIG. 2.

In the digital TV 2, a remote controller receiving unit 5 receives the infrared light signal transmitted from the remote controller transmitting unit 4 and outputs, to a remote controller notification unit 6, a control code contained in the received infrared light signal and corresponding to the pressed button.

In accordance with the state of the digital TV 2, the remote controller notification unit 6 sends the control code to a processing unit for executing a process corresponding to the control code (i.e., corresponding to the button pressed on the remote controller 1) output from the remote controller receiving unit 5.

For example, when the user presses a numeric button while the digital TV 2 is in a state to accept a channel selection operation, the remote controller notification unit 6 notifies a channel selection processing unit 7 of a control code. For example, when the user presses a numeric button while the digital TV 2 is in a state to accept zip code input, the remote controller notification unit 6 notifies a zip code input processing unit (not shown) of a control code.

The channel selection processing unit 7 selects whether to cause the digital TV 2 to receive a broadcast wave or video input. To make the digital TV receive a broadcast wave, the channel selection processing unit 7 further selects a type of broadcasting (one of BS digital broadcasting, CS digital broadcasting, terrestrial digital broadcasting, and terrestrial analog broadcasting) and a channel number. To make the digital TV receive video input, the channel selection processing unit 7 further selects one of a plurality of video input terminals. The channel selection processing unit 7 will be described later in detail with reference to FIGS. 3 and 4.

The combination of the remote controller receiving unit 5, remote controller notification unit 6, and channel selection processing unit 7 functions as an instruction receiving means for receiving a selection instruction of a type of broadcasting or channel number.

A BS/CS digital tuner unit 8 has a satellite antenna input terminal. A terrestrial digital tuner unit 9 has a terrestrial antenna input terminal. Each unit demodulates a signal input from the satellite antenna input terminal or terrestrial antenna input terminal and extracts a digital broadcast signal (transport stream (TS)) in a frequency band corresponding to the selected channel.

A terrestrial analog tuner unit 10 has a terrestrial antenna input terminal. The terrestrial analog tuner unit 10 demodulates a signal input from the terrestrial antenna input terminal and extracts an analog video signal, analog audio signal, and program information in a frequency band corresponding to the designated channel.

A video input unit 11 receives an analog video signal and analog audio signal from the video input terminal selected by the channel selection processing unit 7.

A digital broadcast signal processing unit 12 extracts a digital video signal, digital audio signal, and program information from the digital broadcast signal (TS) extracted by the BS/CS digital tuner unit 8 or terrestrial digital tuner unit 9.

A program information processing unit 13 refers to program information contained in the PSI/SI (Program Specific Information/Service Information) of a digital broadcast signal or the vertical blanking interval of an analog broadcast signal. The program information processing unit 13 generates a video signal containing various kinds of information such as type of broadcasting, channel number, program title, and explanation of the program and outputs the signal to a video processing unit 14.

The video processing unit 14 selectively composites the digital video signal and analog video signal, the video signal output from the program information processing unit 13, and the like, adjusts the image quality, and outputs the image to a display unit 15.

The display unit 15 displays the video image of the program that is being broadcast by the selected channel. For example, the display unit 15 displays the channel number or program title at a corner of the display area, a detailed explanation of the program at a part of the display area, or a program guide in the entire display area. The channel number, program title, detailed explanation of the program, and program guide may be superimposed on the video image of the program.

An audio processing unit 16 adjusts the volume and sound quality of a digital audio signal or analog audio signal and outputs the signal to a speaker unit 17.

An activation/termination processing unit 18 executes a process of activating or terminating the digital TV 2 when the user presses the power button of the remote controller 1.

A timer unit 19 is a so-called clock for holding time measurements. The respective processing units refer to the timer unit 19 as needed.

<Remote Controller 1>

Figure 2:
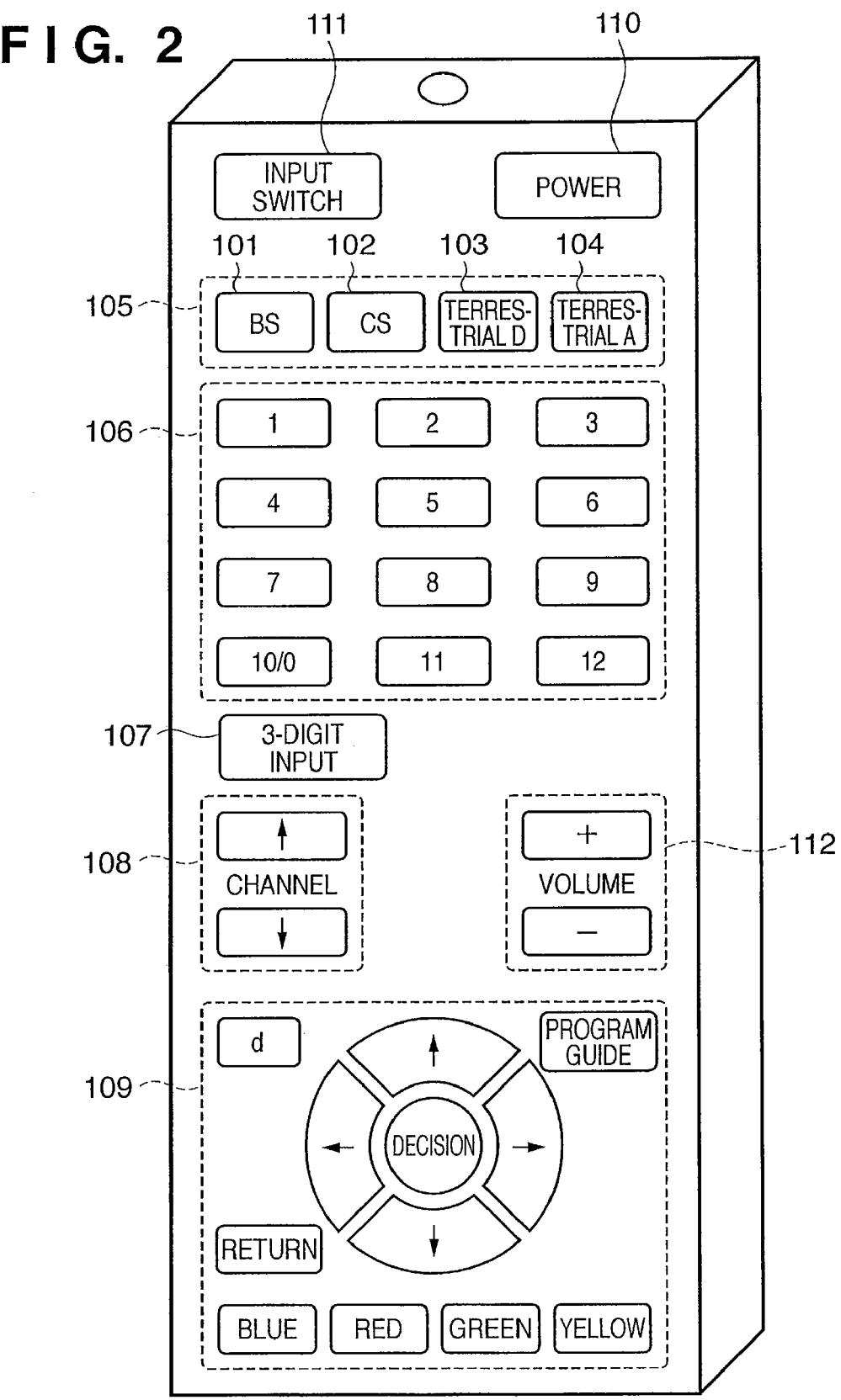
FIG. 2 is a view showing the detailed outer appearance of the remote controller.

FIG. 2 is a view showing the detailed outer appearance of the remote controller 1.

Broadcasting type switch buttons 105 include a BS button 101, CS button 102, terrestrial D (digital) button 103, and terrestrial A (analog) button 104. These buttons are used to select a type of broadcasting to be received by the digital TV 2. That is, the BS button 101 is used to select BS digital broadcasting. The CS button 102 is used to select CS digital broadcasting. The terrestrial D button 103 is used to select terrestrial digital broadcasting. The terrestrial A button 104 is used to select terrestrial analog broadcasting.

Numeric buttons 106 include 12 buttons numbered 1 to 12 (the "10" button also serves as the "0" button). The numeric buttons 106 are used to select a channel number or input a zip code.

A channel number will briefly be described. Several channel numbers are expressed by a number of a plurality of digits (e.g., three digits). For example, in Japan, a 3-digit number is assigned to each channel of terrestrial digital broadcasting, and a channel is expressed as, e.g., channel 011. Since the channel numbers are generally assigned to the numeric buttons of the remote controller, each channel number is sometimes expressed by the number of the corresponding numeric button. For example, when channel 011 of terrestrial digital broadcasting is preset in the numeric button "1" of the remote controller, the channel can be expressed as channel 1 of terrestrial digital broadcasting. Hence, to select channel 011 of terrestrial digital broadcasting, the user may press the "1" button of the remote controller 1 (this channel selection method will be referred to as one-touch channel selection hereinafter). Alternatively, the user may press a 3-digit input button 107 and then press "0", "1", and "1" on the numeric buttons 106 in this order (this channel selection method will be referred to as direct channel selection hereinafter). In the present invention, both a channel number expressed by a numeric button of the remote controller and a 3-digit channel number will simply be referred to as a "channel number" without distinction, unless otherwise specified.

The 3-digit input button 107 is used for direct channel selection. The user presses it before the numeric buttons 106. In this case, the numeric buttons 106 pressed next are handled as numbers 0 to 9 in the remote controller receiving unit 5.

Channel up and down buttons 108 include a channel up button and a channel down button to sequentially select a channel number in a predetermined order.

GUI (Graphical User Interface) operation buttons 109 correspond to a set of buttons to operate the GUI for data broadcasting, a program guide, or the like. The GUI operation buttons 109 include, e.g., a d button to display a data broadcasting window, a program guide button to display a program guide, and four arrow buttons to move a focus point vertically and horizontally. The GUI operation buttons 109 also include an enter button to execute the process of a focused item, a return button to return to the preceding window, and four color buttons to execute processes associated with blue, red, yellow, and green colors.

A power button 110 instructs the digital TV 2 to execute the activation process or termination process. If the user presses the power button 110 while the digital TV 2 is in a power standby (OFF) state, the digital TV 2 executes the activation process and is powered on. If the user presses the power button 110 while the digital TV 2 is in the power ON state, the digital TV 2 executes the termination process and shifts to the power standby state.

An input switch button 111 switches the digital TV 2 between a mode to receive a broadcast wave and a mode to receive video input.

Volume buttons 112 include a volume + button to turn up the volume and a volume − button to turn down the volume.

<Broadcasting Type Selection Process and Channel Number Selection Process>

Figure 3:
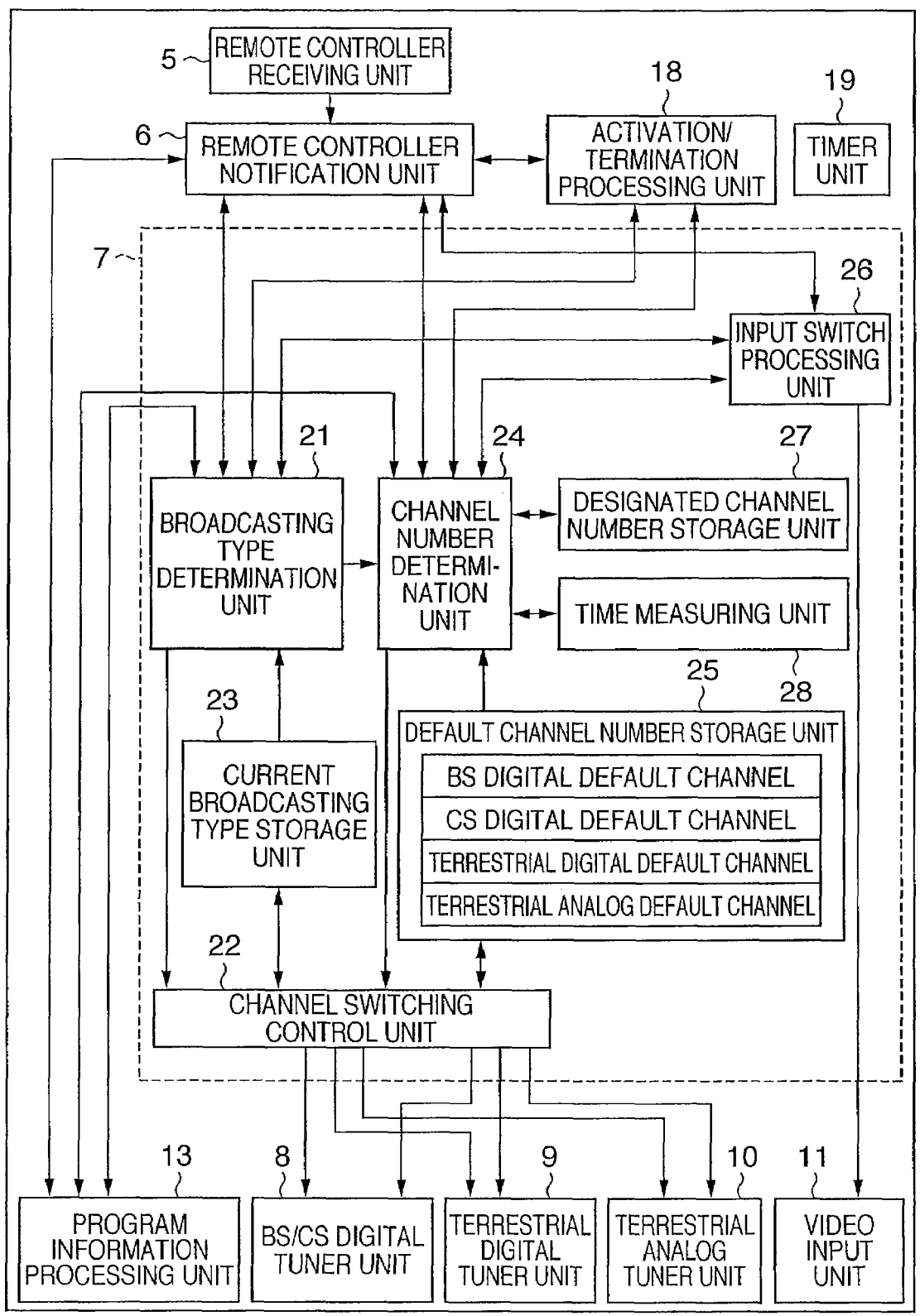
FIG. 3 is a block diagram showing details of the channel selection processing unit of the digital TV set.
Figure 4:
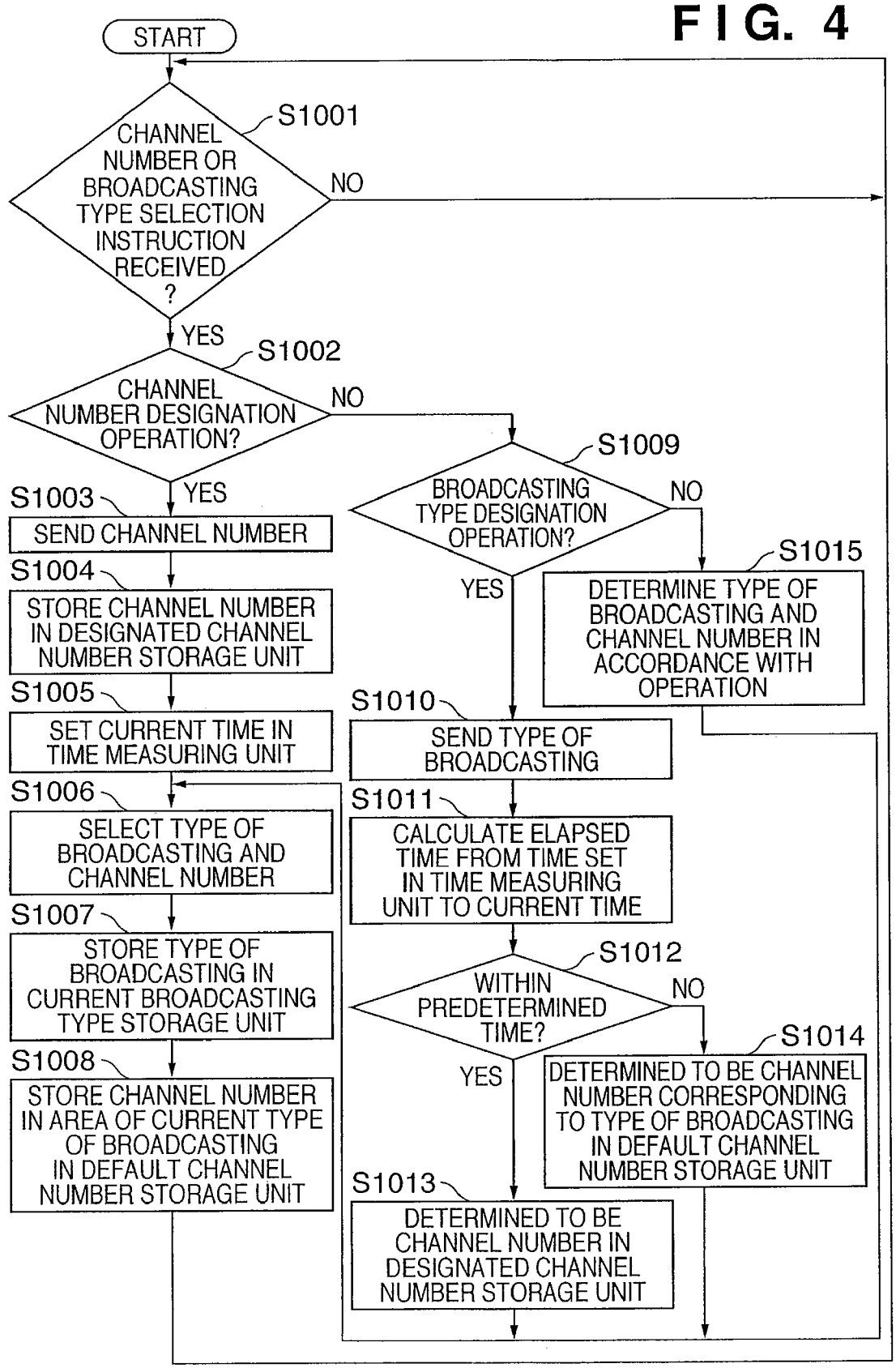
FIG. 4 is a flowchart illustrating the flow of a broadcasting type selection process and channel number selection process in the digital TV set according to the first embodiment.

The broadcasting type selection process and channel number selection process according to this embodiment will be described with reference to FIG. 3 showing details of the channel selection processing unit 7 and FIG. 4 illustrating the flow of the broadcasting type selection process and channel number selection process in the digital TV 2.

In step S1001, the channel selection processing unit 7 waits for reception of a channel or broadcasting type selection instruction. If an instruction is received, the process advances to step S1002. More specifically, for example, when the user presses the broadcasting type switch button 105 of the remote controller 1, a broadcasting type determination unit 21 (FIG.

3) of the channel selection processing unit 7 receives broadcasting type instruction information representing a type of broadcasting to be selected via the remote controller notification unit 6. When the user presses the numeric buttons 106 or channel up and down buttons 108, a channel number determination unit 24 (FIG. 3) of the channel selection processing unit 7 receives channel designation information via the remote controller notification unit 6.

Channel designation information represents different information depending on the channel selection method. For example, when one-touch channel selection is executed, the channel designation information represents information such as "channel 1 by one-touch channel selection". When direct channel selection is executed, the channel designation information represents information such as "channel 011 by direct channel selection". When a channel is selected by using the channel up and down buttons 108, the channel designation information represents information such as "next channel" or "preceding channel".

In step S1002, the channel selection processing unit 7 determines whether the instruction received in step S1001 designates a channel number. More specifically, if the channel number determination unit 24 receives channel designation information by one-touch channel selection or direct channel selection in step S1001, it is determined that the instruction received in step S1001 designates a channel number, and the process advances to step S1003. Otherwise, the process advances to step S1009.

In step S1003, the channel number determination unit 24 notifies a channel switching control unit 22 (FIG. 3) of the channel number represented by the channel designation information.

In step S1004, the channel number determination unit 24 stores, in a designated channel number storage unit 27, the channel number (or channel designation information itself) represented by the channel designation information.

In step S1005, the channel number determination unit 24 sets the current time in a time measuring unit 28 (FIG. 3) by referring to the timer unit 19.

In step S1006, the channel switching control unit 22 selects a type of broadcasting and a channel number on the basis of the type of broadcasting received from the broadcasting type determination unit 21 and the channel number received from the channel number determination unit 24. However, if the process advances from step S1005 or S1015 to step S1006, the channel switching control unit 22 is notified of no type of broadcasting. Hence, the currently selected type of broadcasting is selected. The channel switching control unit 22 enables a tuner corresponding to the selected type of broadcasting and controls the tuner to extract the selected channel. The channel switching control unit 22 also disables tuners except that for the selected type of broadcasting. Hence, only signals output from the enabled tuner are input to the video processing unit 14 and audio processing unit 16.

More specifically, if the selected type of broadcasting is BS digital broadcasting or CS digital broadcasting, the channel switching control unit 22 inputs channel selection parameters to the BS/CS digital tuner unit 8 in accordance with the correspondence table in FIG. 5. The channel selection parameters include network (broadcasting type) identification, transport stream identification, and service identification.

If the selected type of broadcasting is terrestrial digital broadcasting, the channel switching control unit 22 inputs channel selection parameters to the terrestrial digital tuner unit 9 in accordance with the correspondence table in FIG. 6.

If the selected type of broadcasting is terrestrial analog broadcasting, the channel switching control unit 22 inputs a channel selection parameter (a channel corresponding to a VHF or UHF frequency band) to the terrestrial analog tuner unit 10 in accordance with the correspondence table in FIG. 7.

The correspondence tables shown in FIGS. 5 to 7 are stored in, e.g., the memory (not shown) of the channel selection processing unit 7. When a new channel is opened, a channel is disused or changed, or the region where the digital TV 2 is installed is changed, the channel selection parameters are changed. If the channel number designated by the user does not exist in the correspondence table, neither the type of broadcasting nor the channel number is changed.

In step S1007, the channel switching control unit 22 stores, in a current broadcasting type storage unit 23 (FIG. 3), the type of broadcasting selected by the process in step S1006.

In step S1008, the channel switching control unit 22 stores, in a default channel number storage unit 25 (FIG. 3), the channel selected in the type of broadcasting selected by the process in step S1006. Hence, the default channel number storage unit 25 stores a finally selected channel for each type of broadcasting. The process returns to step S1001 to repeat the same process.

If it is determined in step S1002 that the instruction received in step S1001 does not designate a channel number, the process advances to step S1009.

In step S1009, the channel selection processing unit 7 determines whether the instruction received in step S1001 designates a type of broadcasting. More specifically, if the broadcasting type determination unit 21 receives broadcasting type designation information in step S1001, it is determined that the instruction received in step S1001 designates a type of broadcasting, and the process advances to step S1010. Otherwise, the process advances to step S1015.

In step S1010, the broadcasting type determination unit 21 notifies the channel switching control unit 22 and channel number determination unit 24 of the type of broadcasting represented by the broadcasting type designation information.

In step S1011, the channel number determination unit 24 compares the current time of the timer unit 19 with the time (i.e., time of the latest channel number designation) set in the time measuring unit 28 and calculates the elapsed time.

In step S1012, the channel number determination unit 24 determines whether the elapsed time calculated in step S1011 is equal to or less than a predetermined time (e.g., 5 sec). If YES in step S1011, the process advances to step S1013. Otherwise, the process advances to step S1014.

In step S1013, the channel number determination unit 24 notifies the channel switching control unit 22 of the channel number stored in the designated channel number storage unit 27, and the process advances to step S1006.

On the other hand, in step S1014, the channel number determination unit 24 notifies the channel switching control unit 22 of the channel number which corresponds to the type of broadcasting received in step S1010 and is stored in the default channel number storage unit 25, and the process advances to step S1006.

When the channel selection processing unit 7 receives broadcasting type designation information, the channel number determination unit 24 selects a channel number on the basis of the time that has elapsed from the closest channel designation information reception by one-touch channel selection or direct channel selection by the process in steps S1012 to S1014. The "closest" channel designation information reception indicates immediately preceding channel designation information reception. More specifically, if the elapsed time is equal to or less than the predetermined time, the channel number determination unit 24 selects the current channel number (i.e., channel number stored in the designated channel number storage unit 27) again even for the selected type of broadcasting. On the other hand, if the elapsed time is more than the predetermined time, the channel number determination unit 24 selects the default channel number of the selected type of broadcasting. The channel number determination unit 24 notifies the channel switching control unit 22 of the selected channel number. The channel switching control unit 22 controls the tuner unit to receive a broadcast wave specified by the type of broadcasting received from the broadcasting type determination unit 21 and the channel number received from the channel number determination unit 24.

If it is determined in step S1009 that the instruction received in step S1001 does not designate a type of broadcasting, the process advances to step S1015.

In step S1015, the channel number determination unit 24 notifies the channel switching control unit 22 of a channel indicated by the "next channel" or "preceding channel" of the channel designation information, and the process advances to step S1006.

Even when the channel selection processing unit 7 receives an instruction to select a channel or type of broadcasting by an operation other than the operation on the above-described remote controller 1, the broadcasting type determination unit 21 and channel number determination unit 24 notify the channel switching control unit 22 of the type of broadcasting and the like as needed in step S1015. This case corresponds to, e.g., when the user presses the power button 110 to change the digital TV 2 from the power standby state to the power ON state, or when the user presses the input switch button to change the digital TV 2 from the video input state to the broadcast wave receiving state.

With the above-described process (especially steps S1012 to S1014), if the user designates a channel number and then designates a type of broadcasting within a predetermined time, not the default channel of the designated type of broadcasting but the immediately precedingly designated channel number is selected. On the other hand, if the user designates a type of broadcasting more than a predetermined time after channel number designation, the default channel of the designated type of broadcasting is selected.

This further facilitates the user operation of selecting a desired channel. Detailed examples will be described below with reference to FIGS. 8A, 8B, 9A, and 9B.

As shown in FIG. 8A, assume that the user who wants to select channel 3 of BS digital broadcasting wrongly recognizes that he/she is currently watching BS digital broadcasting and presses the "3" button without pressing the BS button 101. If the user is actually watching terrestrial digital broadcasting, channel 3 of terrestrial digital broadcasting is selected. When the user presses the BS button 101 within a predetermined time, step S1013 described above is executed to select channel 3 of BS digital broadcasting.

Consider a case wherein the user wants to select channel 103 of BS digital broadcasting by direct channel selection, as shown in FIG. 9A. Assume that the user wrongly recognizes that he/she is currently watching BS digital broadcasting, presses the 3-digit input button 107 without pressing the BS button 101, and then inputs "1", "0", and "3" on the numeric buttons 106 in this order. If the user is actually watching terrestrial digital broadcasting, channel 103 of terrestrial digital broadcasting is selected. When the user presses the BS button 101 within a predetermined time, step S1013 described above is executed to select channel 103 of BS digital broadcasting.

The same process as described above is executed even when no channel corresponding to the selected channel number exists for the type of broadcasting the user is currently watching.

For example, in FIG. 8A, even when the user presses the "3" button, the channel does not change because terrestrial digital broadcasting does not have channel 3, unlike FIG. 8A. However, that the user has designated channel 3 is stored by the process in step S1004 described above. Hence, when the user presses the BS button 101 within a predetermined time then, channel 3 of BS digital broadcasting is selected.

Even in direct channel selection, the same process as in FIG. 8B is executed, as shown in FIG. 9B.

In the above description, the digital TV 2 is designed to select a default channel stored in the default channel number storage unit 25 when the user designates a type of broadcasting more than a predetermined time after channel number designation. However, the digital TV 2 may be designed to select a channel by another method.

For example, pieces of information including the watch count and watch time of each channel, the watch count and watch time of each genre, and favorite genres and keywords registered by the user in advance are recorded in a predetermined place. The channel the user likes best in the type of broadcasting of interest (or the program the user likes best among the programs that are currently being broadcast in the type of broadcasting of interest) may be estimated on the basis of the pieces of information and selected. The estimation method can use an arbitrary known technique.

As described above, according to this embodiment, when the digital TV 2 switches the type of broadcasting, the channel in the type of broadcasting after switching is selected on the basis of whether a predetermined time has elapsed after the latest channel number designation. More specifically, if the user designates a channel number and then designates a type of broadcasting within a predetermined time, not the default channel of the designated type of broadcasting but the immediately precedingly designated channel number is selected. On the other hand, if the user designates a type of broadcasting more than a predetermined time after channel number designation, the default channel of the designated type of broadcasting is selected.

This further facilitates the user operation of selecting a desired channel number in a desired type of broadcasting in a broadcast receiving apparatus for selectively receiving a broadcast wave specified by a combination of a type of broadcasting and a channel number.

Second Embodiment

In the first embodiment, when the digital TV 2 switches the type of broadcasting, the channel in the type of broadcasting after switching is selected on the basis of whether a predetermined time has elapsed after the latest channel number designation. In the second embodiment, the first embodiment is modified so that a user can more easily recognize whether a predetermined time has elapsed.

In this embodiment, the arrangements of a remote controller 1 and digital TV 2 are the same as in the first embodiment, and a description thereof will not be repeated (refer to FIGS. 1 to 3).

Figure 10:
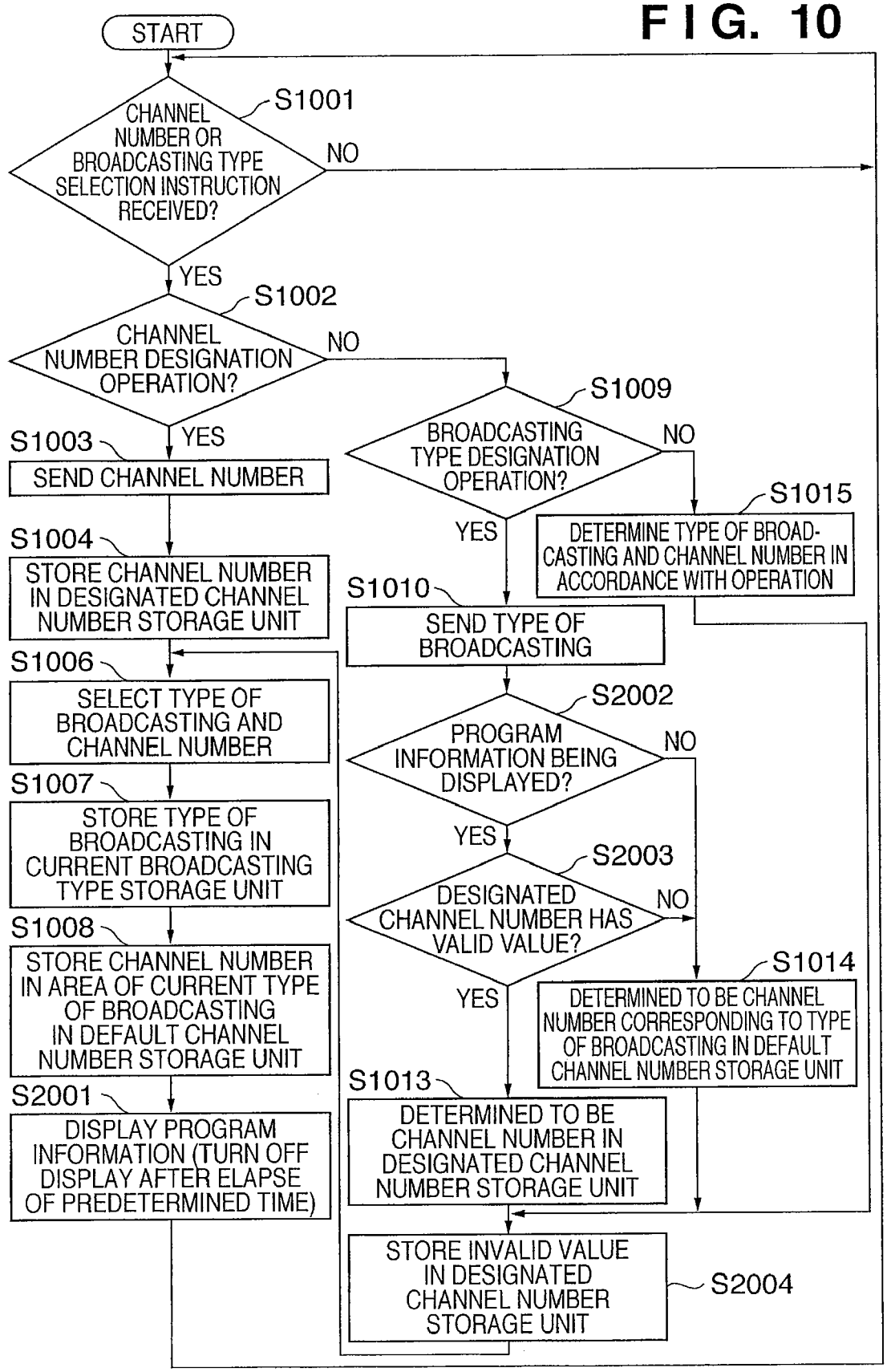
FIG. 10 is a flowchart illustrating the flow of a broadcasting type selection process and channel number selection process in a digital TV set according to the second embodiment.

FIG. 10 is a flowchart illustrating the flow of a broadcasting type selection process and channel number selection process in the digital TV 2 according to the second embodiment. The same step numbers as in the first embodiment denote steps to execute the same processes in FIG. 10, and a description thereof will be omitted (refer to FIG. 4).

In step S2001, a program information processing unit 13 displays the program information of a channel selected by the process in step S1006, which is superimposed on the video image of the program. Additionally, the current time is stored in a time measuring unit 28 by referring to a timer unit 19. The process returns to step S1001 to repeat the same process. The program information processing unit 13 continuously compares the timer unit 19 with the time stored in the time measuring unit 28, although not illustrated. If a predetermined time (e.g., 5 sec) has elapsed from program information display, the program information processing unit 13 stops displaying the program information. The program information processing unit 13 also holds a flag representing whether program information is being displayed.

Program information displayed on, e.g., the upper side of a TV screen 201 includes a one-touch channel number 202, type of broadcasting 203, 3-digit channel number 204, channel logo 205, channel name 206, program title 207, and broadcast time 208, as shown in FIG. 11. The one-touch channel number 202 is one of channel numbers "1" to "12" expressed by the numbers of the numeric buttons of the remote controller 1.

In step S2001, if the program information of a preceding channel is already being displayed, the program information processing unit 13 turns it off and displays the program information of the program after channel selection.

In step S2002, a channel number determination unit 24 inquires of the program information processing unit 13 whether program information is being displayed. If YES in step S2002, the process advances to step S2003. Otherwise, the process advances to step S1014.

In step S2003, the channel number determination unit 24 determines whether a designated channel number storage unit 27 stores a valid channel number. If YES in step S2003, the process advances to step S1013. Otherwise, process advances to step S1014.

In step S2004, the channel number determination unit 24 stores an invalid value in the designated channel number storage unit 27 (e.g., erases the channel number stored in the designated channel number storage unit 27). The process advances to step S1006.

The processes in steps S2003 and S2004 have the following effect. When a channel selection processing unit 7 receives another information between reception of channel designation information by one-touch channel selection or direct channel selection and reception of broadcasting type designation information, the channel selection process (S1013) of the present invention is not executed even if broadcasting type designation information is received after that. Hence, for example, when the user presses channel up and down buttons 108, and immediately after that, a broadcasting type switch button 105, the channel number determination unit 24 selects the default channel of the selected type of broadcasting.

In the above description, the program information processing unit 13 turns off program information when a predetermined time has elapsed from program information display. Instead, the program information processing unit 13 may change the display contents without turning off the program information. In this case, the channel number determination unit 24 determines in step S2002 whether the display contents of the program information are those before change or after change.

For example, the program information processing unit 13 may display a lot of pieces of information, as shown in FIG. 11, before the predetermined time elapses, and display only limited information such as the type of broadcasting 203 or 3-digit channel number 204, as shown in FIG. 12, after the elapse of the predetermined time.

Assume that the user presses the broadcasting type switch button 105 almost simultaneously upon turning off program information display. There is normally a time lag until the digital TV 2 processes the instruction of the broadcasting type switch button 105. For this reason, even when the user should have pressed the broadcasting type switch button 105 during program information display, the digital TV 2 may determine that the button was pressed after turning off the program information display. To prevent this, the digital TV 2 may be designed to determine that the broadcasting type switch button 105 was pressed during program information display if the button was pressed within a predetermined margin period (e.g., 0.5 sec).

As described above, according to this embodiment, the program information processing unit 13 displays program information from channel number designation to the elapse of a predetermined time. When the digital TV 2 switches the type of broadcasting, the channel in the type of broadcasting after switching is selected on the basis of whether the program information processing unit 13 is displaying program information.

This allows the user to more easily recognize whether a predetermined time has elapsed from channel number designation. More specifically, when the user selects a type of broadcasting by the broadcasting type switch button 105, he/she can easily recognize which channel should be selected in the selected type of broadcasting, the immediately precedingly designated channel number or default channel number.

Other Embodiment

The processing described in the above embodiments may be realized by providing a storage medium, storing program codes of software realizing the above-described functions, to a computer system or apparatus. By reading the program codes stored in the storage medium with a computer (or a CPU or MPU) of the system or apparatus and executing them, the functions of the above-described embodiments can be realized. In this case, the program codes read from the storage medium realize the functions according to the embodiments, and the storage medium storing the program codes constitutes the invention. The storage medium, such as a Floppy® disk, a hard disk, an optical disk, a magneto-optical disk and the like can be used for providing the program codes. Also, CD-ROM, CD-R, a magnetic tape, a non-volatile memory card, ROM, and the like can be used.

Furthermore, the functions according to the above embodiments are realized not only by executing the program codes read by the computer. The present invention also includes a case where an OS (operating system) or the like working on the computer performs part or the entire processes in accordance with designations of the program codes and realizes the functions according to the above embodiments.

Furthermore, the program codes read from the storage medium may be written in a function expansion card which is inserted into the computer or in a memory provided in a function expansion unit which is connected to the computer. Thereafter, a CPU or the like contained in the function expansion card or unit may perform part or the entire processes in accordance with designations of the program codes and may realize the functions of the above embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-303382, filed on Nov. 8, 2006, which is hereby incorporated by reference herein in its entirety.

What is claimed is:

1. A broadcast receiving apparatus having a broadcast receiving unit which selectively receives a broadcast wave specified in accordance with broadcasting network indicating information for indicating one of a plurality of broadcasting networks and channel indicating information for indicating a channel number, comprising:
an instruction receiving unit which receives, from a remote controller, broadcasting network indicating information or channel indicating information; and
a control unit which, when said instruction receiving unit receives broadcasting network indicating information, controls said broadcast receiving unit to
receive a broadcast wave specified in accordance with a combination of a broadcasting network indicated by the received broadcasting network indicating information and a channel number indicated by lastly received channel indicating information if an elapsed time from reception of the lastly received channel indicating information is not more than a predetermined time, and
receive a broadcast wave specified in accordance with a combination of a broadcasting network indicated by the received broadcasting network indicating information and a default channel number associated with said broadcasting network if the elapsed time from the reception of the lastly received channel indicating information is more than the predetermined time.

2. The broadcast receiving apparatus according to claim 1, further comprising a storage unit which stores, in a memory, a channel number of a finally watched channel in association with each broadcasting network,
wherein the default channel number is the channel number stored in said memory in association with the broadcasting network.

3. The broadcast receiving apparatus according to claim 1, further comprising an output unit which outputs, to an external device, a video image of the broadcast wave received by said broadcast receiving unit,
wherein said output unit outputs a predetermined image superimposed on the video image until the predetermined time elapses after said instruction receiving unit receives channel indicating information.

4. The broadcast receiving apparatus according to claim 3, wherein the predetermined image is an image that represents at least one of a broadcasting network and a channel number corresponding to the broadcast wave which is being received by said broadcast receiving unit.

5. A control method of a broadcast receiving apparatus having a broadcast receiving unit which selectively receives a broadcast wave specified in accordance with broadcasting network indicating information for indicating one of a plurality of broadcasting networks and channel indicating information for indicating a channel number, comprising:
an instruction receiving step of receiving, from a remote controller, broadcasting network indicating information or channel indicating information; and
a control step of, when the broadcasting network indicating information instruction is received in the instruction receiving step, controlling said broadcast receiving unit to
receive a broadcast wave specified in accordance with a combination of a broadcasting network indicated by the received broadcasting network indicating information and a channel number indicated by lastly received channel indicating information if an elapsed time from reception of the lastly received channel indicating information is not more than a predetermined time, and
receive a broadcast wave specified in accordance with a combination of a broadcasting network indicated by the received broadcasting network indicating information and a default channel number associated with said broadcasting network if the elapsed time from the reception of the lastly received channel indicating information is more than the predetermined time.

6. The control method according to claim 5, further comprising a storage step of storing, in a memory, a channel number of a finally watched channel in association with each broadcasting network,
wherein the default channel number is the channel number stored in said memory in association with the broadcasting network.

7. The control method according to claim 5, further comprising an output step of outputting, to an external device, a video image of the broadcast wave received by said broadcast receiving unit,
wherein said output step outputs a predetermined image superimposed on the video image until the predetermined time elapses after said instruction receiving step receives channel indicating information.

8. The method according to claim 7, wherein the predetermined image is an image that represents at least one of a broadcasting network and a channel number corresponding to the broadcast wave which is being received by said broadcast receiving unit.

9. A computer-readable storage medium embodying a program for causing a computer to execute respective steps of the control method of claim 5.

* * * * *